United States Patent [19]

Meyer

[11] 3,841,316

[45] Oct. 15, 1974

[54] APPARATUS FOR MEASURING THE PSYCHOGALVANIC REFLEX

[75] Inventor: Richard W. Meyer, Toledo, Ohio

[73] Assignee: Owens-Illinois, Inc., Toledo, Ohio

[22] Filed: Feb. 26, 1973

[21] Appl. No.: 335,809

[52] U.S. Cl.............. 128/2.1 Z, 324/62 R, 35/22, 273/1 E
[51] Int. Cl............................................. A61b 5/05
[58] Field of Search......... 128/2.1 Z, 2.1 R, 2.06 R; 273/1 E; 35/22; 324/62 R

[56] References Cited
UNITED STATES PATENTS

| | | | |
|---|---|---|---|
| 2,339,579 | 1/1944 | Milne et al. | 128/2.1 Z |
| 2,379,955 | 7/1945 | Eilenberger | 128/2.1 Z |
| 2,535,249 | 12/1950 | Wilhelm et al. | 128/2.1 Z |
| 2,657,683 | 11/1953 | Koller | 128/2.1 R |
| 2,829,638 | 4/1958 | Douglas | 128/2.1 Z |
| 3,358,228 | 12/1967 | Bucker | 324/62 R |
| 3,727,604 | 4/1973 | Sidwell et al. | 128/2.1 Z |

Primary Examiner—Richard A. Gaudet
Assistant Examiner—Lee S. Cohen
Attorney, Agent, or Firm—Steve M. McLary; E. J. Holler

[57] ABSTRACT

An electronic circuit for measuring the psychogalvanic reflex in human beings. Two finger electrodes are connected on adjacent fingers of a person's hand. These electrodes are part of a resistance bridge circuit which uses a transistor as an unbalance gating device. A meter indicates the bridge voltage. This meter is nulled, or the circuit balanced, by adjustment of a variable resistor. So long as the person to whom the electrodes are attached receives no exciting stimuli, the circuit will remain balanced. Should the person answer a question untruthfully, this will create sufficient stimulus to trigger the psychogalvanic reflex, thus creating a circuit unbalance due to the decrease in apparent skin resistance. This unbalance will appear as an increased transistor collector current and will cause a meter deflection, thus indicating that a particular response was not truthful.

1 Claim, 1 Drawing Figure

PATENTED OCT 15 1974 3,841,316
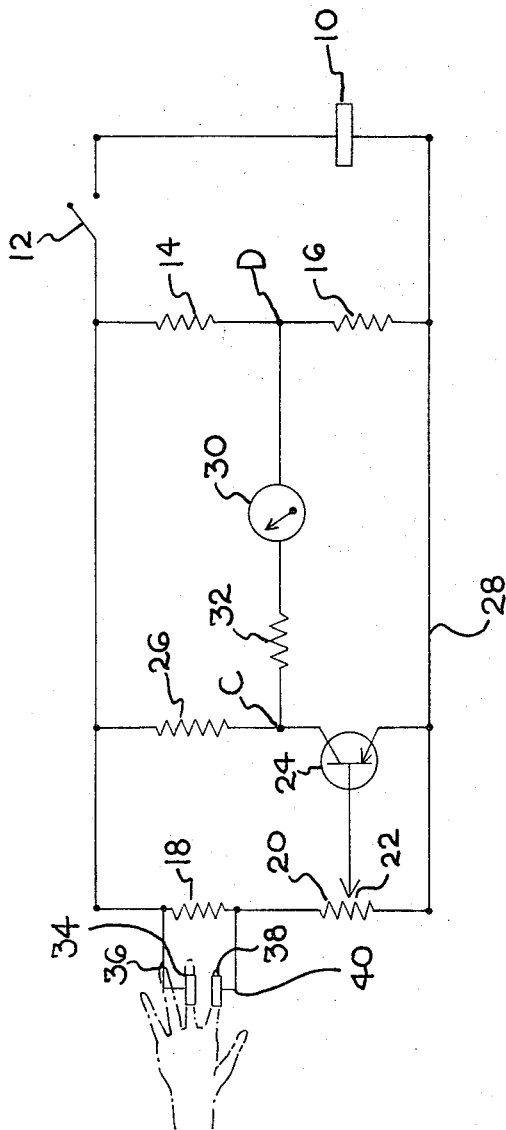

APPARATUS FOR MEASURING THE PSYCHOGALVANIC REFLEX

BACKGROUND OF THE INVENTION

This invention generally relates to electronic detection circuits. Most specifically, this invention relates to a circuit for measuring the psychogalvanic reflex in human beings.

The psychogalvanic reflex in human beings is the well known decrease in apparent skin resistance resulting from exciting stimuli. For example, speaking a deliberate untruth will trigger this reflex. This reflex has been used in so-called lie detectors in the past. My invention resides in a circuit for measuring this reflex which is sensitive and yet inexpensive enough to allow a device utilizing the circuit to be sold as a part of a toy lie detector. Somewhat similar circuits in the prior art may be seen in U.S. Pat. Nos. 2,535,249; 3,479,590; and 3,038,106.

SUMMARY OF THE INVENTION

This invention is an apparatus for measuring the psychogalvanic reflex in human beings. A switch is connected in series with a voltage source. A first resistor and a second resistor are connected in series with one another and in parallel with the voltage source. A third resistor is connected in parallel with the first and second resistors. A variable resistor, having a variable voltage tap, is connected in series with the third resistor. A transistor with a base, a collector and an emitter has its base connected to the variable voltage tap and its emitter connected to the voltage source. A fourth resistor, connected in parallel with the first and second resistors, is connected to the collector of the transistor. A galvanometer type meter is connected between the collector of the transistor and a circuit node between the first and second resistors. A fifth resistor is connected in series with the meter. Electrode means for engaging the skin of a person to sense the resistance of the skin of that person are connected to form a resistance in parallel with the third resistor.

BRIEF DESCRIPTION OF THE DRAWING

The drawing FIGURE is a schematic circuit diagram of the present invention.

DETAILED DESCRIPTION OF THE DRAWINGS

FIG. 1 illustrates, in schematic form, the electrical circuit of the present invention. A power supply or voltage source 10, which in this case is preferably a 9 volt battery, is connected to a switch 12. The switch 12 is connected to a first resistor 14. A second resistor 16 is connected in series with the first resistor 14, and is connected to the other terminal of the power supply 10. A third fixed resistor 18 is connected in series with a potentiometer 20 which has a movable or variable voltage tap 22. The third fixed resistor 18 and the potentiometer 20 are connected in parallel with the first and second resistors 14 and 16. The tap 22 of the potentiometer 20 is connected to the base of a transistor 24. The collector of the transistor 24 is connected to a fourth fixed resistor 26 which in turn is connected in the circuit intermediate the first and second resistors 14 and 16 and the third fixed resistor 18 and potentiometer 20. The emitter of the transistor 24 is connected to a common electrical line 28 into which are connected the potentiometer 20, the second fixed resistor 16 and one terminal of the power supply 10. A galvanometer type meter 30 is connected between two circuit nodes C and D. The node C is at the collector terminal of the transistor 24. The node D is located between the first fixed resistor 14 and the second fixed resistor 16. A sixth resistor 32 is connected in series with the meter 30 between the circuit node C and the meter 30 and acts as a voltage absorber to drop the voltage appearing across the meter 30 and thus constrain the meter 30 to act as a volt meter. A first finger probe 34 is connected through an electrical wire 36 to one side of the third fixed resistor 18. A second finger probe 38 is connected through an electrical wire 40 to the opposite side of the third fixed resistor 18. The finger probes 34 and 38 may be those shown in U.S. Pat. No. 2,535,249. However, the finger probes 34 and 38 are preferably those which are shown in a co-pending application, having an assignee in common with the present application, U.S. Pat. application Ser. No. 335,809, filed Feb. 26, 1973.

In operation, the finger probes 34 and 38 are placed on adjacent fingers of a person's hand. This then creates a complete circuit from one finger probe 34 to the other finger probe 38 across the skin of the person's finger. There is, therefore, a parallel resistance combination furnished by the body resistance of the person being examined and the third fixed resistor 18. When the switch 12 is closed, an electrical circuit will be completed which includes the fingers of the person being examined. With the switch 12 closed, depending upon the setting of the tap 22 of the potentiometer 20, there will be a net current flow through the collector of the transistor 24. This will cause a voltage difference between the circuit nodes C and D which will be indicated on the meter 30. At this point, the reading on the meter 30 is an indeterminate value which must be corrected to obtain a null or zero reading on the meter 30. It should be clear to one skilled in the art that the entire circuit is a bridge circuit which is unbalanced by any changes in the electrical resistance sensed by the finger probes 34 and 38. Thus, the first step is to adjust the tap 22 of the potentiometer 20 until the meter 30 is nulled or shows a zero reading. This balances the entire circuit, and there is no net current flow from the collector of the transistor 24. With the circuit so balanced, the bodily electrical resistance of the person under examination should remain relatively constant so long as the person receives no exciting stimuli. However, should the person become excited, as for example the reaction created by telling an untruth or answering a question posed to the person untruthfully, the apparent electrical resistance of the fingers of the person will become smaller as a result of increase in skin moisture content. This is the well known psychogalvanic reflex. When the resistance sensed by the finger probes 34 and 38 decreases, this will, of course, decrease the overall resistance of the parallel combination of the resistor 18 and the resistance sensed by the two finger probes 34 and 38. This will then cause a change in the collector current of the transistor 24 which will establish a new voltage difference across the circuit nodes C and D which will be indicated on the meter 30. It has been found that this circuit is quite sensitive in detecting the psychogalvanic reflex and yet may be made at a relatively small cost, thus making it suitable for manufacture as a child's toy. On the other hand, the circuit is quite sensitive and will obtain repeatable results and thus is quite interesting and useful as well as providing entertainment for children. It is possible, under some circumstances, to lower the skin resistance as sensed by the finger probes 34 and 38 to such a point that it might be possible to overload the meter 30. That is, since the currents being dealt with, resulting from changes in skin conductivity, are relatively small in magnitude, the meter 30 must be a relatively sensitive one. In the use of such meters, there is always the danger of overloading the meter accidentally. Since this device is designed primarily for use by children, it is most important to provide safety precautions to prevent damage to the meter 30 as a result of careless operation by a child. In case the resistance, as sensed by the finger probes 34 and 38 is much below that to be normally expected, for example, a person with wet fingers is being examined, the collector current is limited in the amount of current available to the meter 30 by a cutoff of the transistor action. When the base current reaches a sufficiently high flow, the node C approaches a limiting lower voltage which is the cutoff of transistor action and further base current is prevented from producing more voltage change across the meter 30. In addition, when the finger probes 34 and 38 are disconnected from the fingers, the meter 30 could deflect downscale full range and overload the meter if the tap of the potentiometer 20 is set at a fairly low resistance value. This places a relatively high voltage at the circuit node C and a reversed current through the meter. In this situation, the relative values of the resistors in the circuit fix a limiting current through the meter which holds the maximum flow through the meter 30 to less than 100 percent overload. The meter 30 has been designed by its manufacturer to accept 100 percent to 150 percent overload without damaging the meter movement.

What is claimed is:

1. Apparatus having automatic meter overload protection for measuring the psychogalvanic reflex in human beings comprising, in combination:
   a. a voltage source;
   b. a switch connected in series with said voltage source;
   c. a first resistor connected in parallel with said voltage source;
   d. a second resistor, connected in series with said first resistor and connected to said voltage source;
   e. a third resistor connected in parallel with said first and second resistors;
   f. a variable resistor, connected in series with said third resistor, having a variable voltage tap connection;
   g. a transistor with a base, a collector and an emitter, having its base connected to said variable voltage tap and its emitter connected to said voltage source;
   h. a fourth resistor, connected in parallel with said first and second resistors and connected to the collector of said transistor;
   i. a galvanometer type meter connected between the collector of said transistor and a circuit node located between said first and second resistors;
   j. a fifth resistor connected between the collector of said transistor and said meter; and
   k. electrode means for engaging the skin of a person to sense the resistance of the skin of said person and connected to form a resistance in parallel with said third resistor.

* * * * *